United States Patent [19]

Nacci

[11] 4,323,929
[45] Apr. 6, 1982

[54] PRINTING PROCESS USING LITHOGRAPHIC PLATES MADE FROM TONED AMPLITUDE MODULATED MAGNETIC IMAGES

[75] Inventor: George R. Nacci, Wilmington, Del.

[73] Assignee: E. I. Du Pont de Nemours and Company, Wilmington, Del.

[21] Appl. No.: 98,987

[22] Filed: Nov. 30, 1979

[51] Int. Cl.$^3$ .............................................. H04N 1/28
[52] U.S. Cl. ................................... 358/301; 346/74.2
[58] Field of Search ......................... 360/56; 358/301; 346/74.1, 74.2; 430/39, 302; 101/459, 463.1, 465

[56] References Cited

U.S. PATENT DOCUMENTS

| | | | |
|---|---|---|---|
| 2,826,634 | 3/1958 | Atkinson | 358/301 |
| 3,108,281 | 10/1963 | Uemura | 358/301 |
| 3,185,777 | 5/1965 | Rheinfrank | 358/301 |
| 3,554,798 | 1/1971 | Nacci | 358/301 |
| 3,555,556 | 1/1971 | Nacci | 346/74.1 |
| 3,627,682 | 12/1971 | Hall | 346/74.1 |
| 3,804,511 | 4/1974 | Rait | 346/74.1 |
| 3,861,952 | 1/1975 | Tokumoto | 101/459 |
| 3,911,483 | 10/1975 | Kihara | 360/33 |
| 4,090,880 | 5/1978 | Chu | 101/459 |
| 4,195,303 | 3/1980 | Edwards | 346/74.1 |

FOREIGN PATENT DOCUMENTS

| | | | |
|---|---|---|---|
| 4383 | 3/1979 | European Pat. Off. | 358/301 |

OTHER PUBLICATIONS

"Side Fringing Fields & Write & Read Crosstalk of Narrow-Magnetic Recording Heads" by Herk, IEEE Transactions of Magnetics, Mag-13, 1021 (1977).
Handbook of Thin Film Technology by Missel et al., McGraw-Hill Book Co. pp. 6-13 to 6-17.

Primary Examiner—Bernard Konick
Assistant Examiner—Alan Faber

[57] ABSTRACT

A lithographic printing process wherein an illuminated image on a document is scanned in a series of parallel sweeps with a photocell, applying an electric wave signal to a magnetic recording head with the amplitude of said signal determined by the output of the photocell and a function of the optical density of the image being scanned. The magnetic head has a width of from about 0.5 mils to about 5 mils and traverses a magnetic recording medium in a series of aligned parallel paths analogous to those scanned by the photocell to form a latent magnetic image in the magnetic recording medium, which image is a replica of the image being scanned. The horizontal spatial frequency is from about 200 to 1000 cycles/inch. The thus formed latent magnetic image is decorated with an oleophilic magnetic toner. The oleophilic magnetic image is transferred under pressure to a smooth heated lithographic substrate. If necessary, the toner is further heated to effect complete coalescence thereof. The thus formed lithographic printing plate is then used for lithographic printing.

8 Claims, 1 Drawing Figure

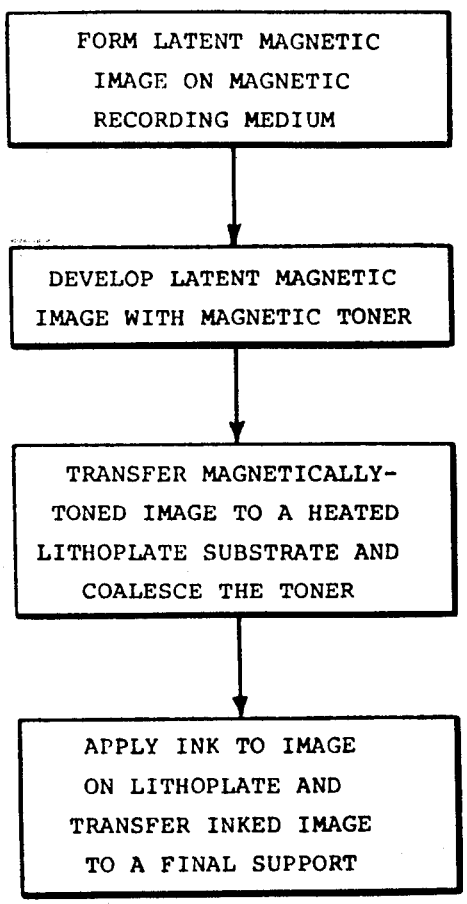

PRINTING PROCESS USING LITHOGRAPHIC PLATES MADE FROM TONED AMPLITUDE MODULATED MAGNETIC IMAGES

BACKGROUND OF THE INVENTION

1. Field of the Invention

This invention relates to a printing process using lithographic plates which are made from toned amplitude modulated magnetic images.

2. Background Description

Most commercial printing plates for lithography are made by preparing 150 line/in halftone transparencies from continuous tone images and using the transparency to expose an oleophilic photosensitive layer on a water receptive substrate. The lithoplate is then mounted on a lithopress where ink will be applied and will adhere to the oleophilic regions and water will adhere to the hydrophilic regions. The ink film thickness is about the same for large dots as for small dots, since lithography is an on-off process.

R. B. Atkinson and S. G. Ellis, U.S. Pat. No. 2,826,634 describe a method for reproducing pictures which involves forming an amplitude modulated latent magnetic image using anhysteretic recording, toning said image with magnetic particles and transferring the magnetic particles to a final support, in particular paper or coated paper, using pressure or combinations of pressure and a dampened support. If additional copies are desired, the latent magnetic image is retoned and the toner transferred to another final support. No mention is made of magnetic recording distortions resulting from having recording tracks too close together.

EPO Publication No. 0.004,383 discloses a resist process comprising decorating a latent magnetic image with coalescible magnetic toner particles to form a toner image, bringing the toner image into momentary contact under pressure with a heated substrate surface to tackify the toner particles forming said image which are in contact with the heated substrate surface thereby causing said particles to adhere to said heated substrate. The thus transferred particles form an image of at least partially coalesced toner particles on said heated surface. Further coalescing of said toner particle image may be necessary to form an impervious image. The area of said surface not covered by the resultant resist image is treated to make it hydrophilic or hydrophobic, opposite that of said resist image, so as to form a planographic printing plate.

We know of no discussions of the effect of line-to-line interactions on the resultant visual image obtained for a magnetically recorded image which is subsequently developed by applying a magnetic toner. A. van Herk, IEEE Transactions of Magnetics, Mag-13, 1021 (1977), has calculated the amplitude of the read crosstalk signal as a function of the field strength of the recording field and the head-to-recording medium distance for signals recorded and read by magnetic heads and uses the results as a basis for suggesting line-to-line spacings for this type of situation.

SUMMARY OF THE INVENTION

It has now been discovered that excellent quality high resolution copies can be made by a printing process which comprises applying an electric wave signal such as a sine or square wave recording signal to a magnetic record head with the amplitude of said signal a function of the optical density of the desired image; causing said magnetic record head to traverse a magnetic recording medium in a series of aligned parallel paths to form a latent magnetic replica of the desired image on the recording medium; having this line-to-line (path-to-path) spacing sufficiently large to prevent magnetic line-to-line interaction; developing the latent magnetic image by applying to the magnetic recording medium a magnetic toner comprised of magnetic particles, individually encapsulated in a coalescible polymer binder, dispersed in a liquid vehicle, thereby forming a toned image; rinsing said toned image with a liquid such as the liquid vehicle or water; air-drying said toned image; bringing said toned image into momentary contact under pressure with a heated smooth, rigid metallic lithoplate substrate whereby said toner particles are transferred to said heated substrate to form an image of at least partially coalesced toner particles on said substrate; further coalescing said image if necessary thereby forming a lithographic printing plate which will accept ink in the toned areas containing the ink receptive polymer but will not accept ink in the areas free of toner; applying ink to said lithoplate; and transferring the ink either directly or by offset printing to a final support to form the desired printed copy.

Preferred is a process for printing copies of an image which comprises projecting a beam of light onto said image; scanning said image with a photocell which receives light emanating from the image which light may be either reflected from or transmitted through the image containing document, said scanning being accomplished in a series of parallel sweeps in the form of narrow paths across said image; applying a sine or square wave recording signal to a magnetic record head with the amplitude of said signal determined by the output of the photocell and corresponding to the optical density of the image; causing said magnetic record head to scan a magnetic record medium in a series of aligned parallel paths analogous to those traversed by the photocell to form a latent magnetic replica of the desired image on the record medium with the intensity of the magnetic record of any individual area related to the integrated intensity received by the photocell from a corresponding area of the original image; having this line-to-line (path-to-path) spacing sufficiently large to prevent magnetic line-to-line interaction; developing the latent magnetic image by applying to the magnetic record medium a magnetic toner comprised of magnetic particles, individually encapsulated in a coalescible polymer binder, dispersed in a liquid vehicle, thereby forming a toned image; rinsing said toned image with a liquid such as said liquid vehicle or water; air-drying said toned image; bringing said toned image into momentary contact under pressure with a heated smooth, rigid metallic lithoplate substrate whereby said toner particles are transferred to said heated substrate to form an image of at least partially coalesced toner particles on said substrate; further coalescing said image if necessary thereby forming a lithographic printing plate which will accept ink in the toned areas containing the ink receptive polymer but will not accept ink in the areas free of toner; applying ink to said lithoplate; and transferring the ink either directly or by offset printing to a final support to form the desired printed copy.

Generally the distance between the centers of the parallel paths (line-to-line spacing) of the magnetic record head will be between about 1.2 to 2 times the record head width. Spacings of 1.4 to 1.6 times the record head width are preferred.

It is preferred in the process of this invention to use a magnetic recording medium at least 100 μm thick, to have a horizontal spatial frequency of from about 200 to 1000 cycles/in, to have the magnetic record head width between about 0.5 mil and 5 mils (12.7 μm to 127 μm), to have the average size of the magnetic toner particles between 2 and 7 μm, and most preferably between 2 and 3 μm, to have a lithoplate substrate of anodized aluminum, brushed grained aluminum, aluminum matte, chrome plate or stainless steel with the roughness of the substrate surface less than about 10μ inches (0.25 μm) and most preferably less than 5μ inches (0.13 μm).

BRIEF DESCRIPTION OF DRAWING

The FIGURE provides a schematic representation of the process of the invention.

DETAILED DESCRIPTION OF THE INVENTION

The printing process of this invention may be divided into four parts:

(1) magnetically writing with a record head on a magnetic record medium by having the record head traverse the record medium in a series of aligned parallel paths while the amplitude of the record signal applied to the record head is modulated so that the intensity of magnetization of a given region of the magnetic medium is a measure of the desired optical intensity of the region of the final image;

(2) developing the latent magnetic image by decorating the magnetic record medium with an oleophilic magnetic toner dispersed in a liquid;

(3) transferring the magnetic toner to a lithoplate substrate by contacting under pressure the toned image and the heated lithoplate substrate to form an image of at least partially coalesced toner particles on the substrate and further coalescing the toner particle image if necessary to form a lithographic plate and;

(4) applying ink to said lithoplate and transferring the ink either directly or indirectly as by offset printing to a final support to form the desired copy.

This printing process involves a number of variables. However, excellent quality copies with high resolution can be obtained if the teaching of the instant invention is followed.

The amplitude modulated record signal can be generated by modulating the signal directly according to a desired pattern or may be obtained by sensing the optical density of an original image to be copied. In either case the amplitude of the record signal is set at one level corresponding to black and a second level corresponding to white with intermediate amplitudes corresponding to the continuous tones between black and white. If copies are to be made of a document, the document is scanned with a photocell in a series of parallel sweeps in the form of narrow lines across the image. A beam of light is projected onto the document and the photocell receives light emanating therefrom which may be either reflected from or transmitted through the image containing document depending upon whether the document itself is opaque or transparent. The photocell receives light from a small region of the document and the output of the photocell is related to the integrated intensity of the light received from the given small region and varies with the local optical density of the image to be copied. This varying output is used to modulate the amplitude of the square or sine wave recording signal which is applied to the magnetic record head. The magnetic record head scans the magnetic record medium in a series of aligned parallel paths. The scanning must be synchronized with the amplitude modulated recording signal; for example, when an image on a document is to be copied, the scanning of the record head must correspond to the scanning of the photocell. The intensity of magnetization of a given region of the magnetic medium is then a measure of the desired optical intensity of the corresponding region of the image. The number of parallel scan lines per inch places an upper limit on the possible resolution in the vertical direction and the number of cycles per inch along a scan line places an upper limit on the possible resolution in the horizontal direction. The closer the lines and the higher the cycles/in, the higher the possible resolution. However, these limits can be achieved only if all the other steps in the printing process maintain this resolution and the scan rate and cycle/in are chosen accordingly. As the record signal strength is increased, the toned area dimensions increase in both the longitudinal and transverse directions, i.e., along the track and perpendicular to it. However, for the proper line-to-line spacings, there is still a space between tracks. Further increases in signal strength causes the toner to pile up into a multi-particle layer. When the toned image is melt transferred to the lithoplate substrate, there is a controlled squeeze out of the multi-particle layer which gives the desired printing characteristics. Failure to have sufficient line-to-line spacing results in interference effects between the record signals of adjacent lines and correspondingly severely distorted images with a visible herringbone pattern. This distortion is visible on the lithoplate and on final prints made from the lithoplate. It is noted particularly when very high resolution imaging is desired and thus the desired high resolution cannot be achieved unless the interference effects are prevented. These interference effects can be avoided if the distance between the centers of the scan lines, i.e., between the centers of the parallel paths of the magnetic record head, is at least about 1.2 times the record head width. Highest resolution is obtained when the scan lines are as close as possible, subject of course to the minimum distance imposed to avoid interference effects. Generally a range for the distance between scan lines is about 1.2 to 2 times the record head width. Spacings greater than this, while giving an undistorted image, are lower in resolution. Spacings of 1.4 to 1.6 times the record head width are preferred. Magnetic record head widths of 0.5 mil to 5 mils (12.7 μm to 127 μm) are preferred with a 1.5 mil (38.1 μm) head width typical of the current technology. The horizontal scan speeds are typically 100–200 in/sec (254/508 cm/sec) and the square or sine wave frequency is typically 20,000–200,000 cycles/sec to result in a horizontal spatial frequency of from about 200 to 1000 cycles/in (80 to 400 cycles/cm).

For a 1.5 mil (38.1 μm) wide head, the distance between centers of the scan lines is typically 2 mils (50.8 μm) corresponding to 500 scan lines/in (200 scan lines/cm). The magnetic record medium must be sufficiently thick and have the necessary magnetic properties to sustain the latent magnetic image and provide sufficient magnet field strength to attract and hold the toner particles. A thickness of 100μ inch (2.5 μm) or more are preferred. The magnetic material can be $CrO_2$, $\gamma Fe_2O_3$, Fe, Fe-Ni, and similar magnetic recording materials.

The latent magnetic image is developed by applying a wet oleophilic magnetic toner to the magnetic medium by methods well-known in the art, e.g., U.S. Pat. No. 3,555,556. The toner is comprised of magnetic particles, which are individually encapsulated in a coalescible polymer binder, dispersed in a liquid vehicle. The size of the toner particles must also be chosen properly to preserve the resolution of the latent image. Toner particle size is determined by the horizontal scan wavelengths. Average particle sizes of less than about 1/5 and 1/6 of the horizontal scan wavelengths provide acceptable results with average particle size of 1/10 to 1/20 of a wavelength preferred. Good quality copies have been demonstrated for the conditions given above with average toner particle size of from about 2 to 7 $\mu$m. Toner particle sizes of from 2 to 3 $\mu$m are preferred. A wet toner has been found to be necessary to obtain high resolution because it allows the toner particles to more easily move across the magnetic record medium and more readily and accurately decorate the high resolution latent image and maintain the gray scale necessary for high resolution imaging. Dry toners do not give a broad gray scale, are low in resolution and tend to suffer from having poor quality background areas.

The coalescible oleophilic polymer binder coatings on the toner particles provide a means for transferring the magnetically held image of toner particles to the lithoplate substrate by means of heat and pressure. This transfer process along with the properties required of the coalescible polymers are described in the aforesaid EPO publication No. 0.004,383. The wet magnetic toner is comprised of from 40 to 60% by weight of a magnetic material such as $Fe_3O_4$, Fe, $CrO_2$ or ferrites, and 40 to 60% by weight of a coalescible polymer and preferably a coalescible polymer with good ink receptivity. This mixture is dispersed in a liquid such as water. Generally a dispersing agent should be used. Following the application of the wet toner, the toned image is rinsed with water which preferably contains a dispersing agent to remove excess toner particles and toner particles adhering to unmagnetized areas (background areas) and the toned image is then air-dried.

The toned image is then brought into momentary contact under controlled pressure with the heated lithoplate substrate as described in the above-mentioned EPO Publication to tackify said particles to cause them to adhere to the heated substrate and form an image of at least partially coalesced toner particles on the substrate. Further coalescing of the transferred image can be achieved if necessary by post-transfer heating. The coalescing forms a continuous toner layer in the "black" regions of the transferred image.

In order that the transferred image on the substrate may serve as a lithoplate, it is necessary that ink be accepted only in the toned areas and not in the untoned areas, or vice versa. One way of achieving this result is to use an oleophilic toner and hydrophilic support such as anodized aluminum, brush grained aluminum, aluminum matte, chrome plate, or stainless steel. The image is comprised of toned elements some of which are finer than 0.1 mils. A rigid smooth substrate is necessary to produce a distortion free image on the lithoplate. The substrate must have a roughness of less than about 10$\mu$ inches (0.25 $\mu$m) in order to maintain the desired quality and resolution of the copy. A substrate with roughness less than 5$\mu$ inches (0.125 $\mu$m) is preferred. For details of roughness measurements, see for example "Handbook of Thin Film Technology" Ed. E. J. Maissel and R. Glang, McGraw-Hill Book Co., pp. 6-15 and 6-17.

This process results in lithoplates like those that would be made using halftone transparencies with 200 lines or more per in. Such plates are superior to the typical commercial lithographic plates having 150 lines per in and would be very difficult to prepare optically, especially, for example, at 500 lines/in.

This process for printing allows one to change the printed image in a given region by adjusting the amount of modulation of the amplitude of the recording signal for that region. Tone, contrast, etc. can be adjusted in this way.

This process can also be used to print color copies by making individual lithoplates for the composite colors in a manner similar to that described above. For example, continuous tone color separation images of the composite colors are printed on black and white photographic paper and scanned by the photocell and the output of the photocell used to amplitude modulate the recording signal for the respective lithoplates.

SPECIFIC EMBODIMENTS OF THE INVENTION

EXAMPLES 1–3

A reflectance step wedge was scanned with a photocell and the output of the photocell used to set the amplitude modulation of the square wave recording signal. The record currents corresponding to the reflectance optical densities of the original were:

| Original Optical Density | Record Current, mA |
| --- | --- |
| 0.05 | 7.9 |
| 0.12 | 8.9 |
| 0.20 | 10.8 |
| 0.35 | 12.9 |
| 0.50 | 17.8 |
| 0.65 | 20.6 |
| 0.80 | 22.1 |
| 0.95 | 29.2 |
| 1.10 | 37.2 |
| 1.25 | 40.1 |
| 1.40 | 43.1 |
| 2.10 | 50.1 |

The record current was applied to a 1.5 mils (38.1 $\mu$m) wide Betamax ® 98-6001-91 head which scanned a 170$\mu$ in (4.3 $\mu$m) thick $CrO_2$ magnetic record medium that was coated onto 5-mil (0.13 mm) aluminized Mylar ®. The line-to-line spacing was 2 mils (50.8 $\mu$m). Magnetic recordings were made using different horizontal spatial frequencies for the square wave: 250, 300, and 350 cycles/in (98.4, 118.1, and 137.8 cycles/cm) for Examples 1, 2 and 3 respectively to determine the effect on printing quality.

Each of the latent magnetic images was toned with a magnetic toner bath comprised of 10 g of magnetic toner dispersed in 500 cc of $H_2O$ containing 2.5 g Fluorad ®FC-128 dispersing agent. The magnetic toner was comprised of 50 weight percent $Fe_3O_4$ and 50 weight percent Atlac ®382 polyester resin purchased from ICI, Ltd. (a propoxylated bisphenol-A, fumaric acid polyester having a tack point of 70° C. and a liquid point of 100° C.) with average toner particle size of 2–3 $\mu$m. The toned image was rinsed with solution comprised of 2.5 g Fluorad ®FC-128 available from 3 M Company in 500 cc of $H_2O$ and then air dried.

Each of the three toned images was, in turn, mounted on the 5" (12.7 cm) diameter print roll of the toner image transfer apparatus disclosed in Nacci and Pye, cited above. This apparatus also has a 5" (12.7 cm) diameter nip roll. Citiplate D-50 anodized aluminum plate with a surface roughness of 9μ inches (0.23 μm) served as the lithoplate substrate and was preheated to 121° C. and contacted with the magnetic image at a transfer nip pressure of 40 lbs per linear inch (70 N per linear cm) and at a rate of 6 in/sec. (15.2 cm/sec). The toner transferred completely to the anodized aluminum substrate to form a lithoplate.

The lithoplates were mounted on a Miehle offset lithography press and printed onto white glossy paper using black ink. The optical densities by reflectance of the original compared with those of the printed copies are shown below for each Example.

| Original Optical Density | Copy's Optical Densities | | |
|---|---|---|---|
| | Example 1 250 cycles/in | Example 2 300 cycles/in | Example 3 350 cycles/in |
| 0.05 | 0.06 | 0.07 | 0.07 |
| 0.12 | 0.11 | 0.13 | 0.13 |
| 0.20 | 0.17 | 0.21 | 0.20 |
| 0.35 | 0.28 | 0.31 | 0.34 |
| 0.50 | 0.44 | 0.49 | 0.65 |
| 0.65 | 0.53 | 0.65 | 0.80 |
| 0.80 | 0.56 | 0.80 | 0.90 |
| 0.95 | 0.68 | 0.89 | 1.04 |
| 1.10 | 0.77 | 0.93 | 1.26 |
| 1.25 | 0.82 | 0.98 | 1.28 |

The optical density of the printed copy made using the 350 cycles/in horizontal scan correlated best with those of the original. Minor adjustments in the amplitude of the recording currents corresponding to original optical densities would provide essentially exact duplication of the original.

EXAMPLE 4

Printing of a copy of a continuous tone image was carried out in a manner identical to that used for Examples 1-3 with a horizontal scan rate of 350 cycles/in (137.8 cycles/cm) and the following record currents:

| Original Optical Density | Record Current, mA |
|---|---|
| 0.05 | 7.9 |
| 0.12 | 8.9 |
| 0.20 | 10.5 |
| 0.35 | 12.2 |
| 0.50 | 16.6 |
| 0.65 | 19.4 |
| 0.80 | 21.1 |
| 0.95 | 26.0 |
| 1.10 | 30.0 |
| 1.25 | 31.5 |
| 1.40 | 32.9 |
| 2.10 | 37.8 |

The printed image appeared grainy. The surface roughness was 9.02μ inches. The use of smoother lithoplate substrates will essentially eliminate thr grainy appearance.

EXAMPLE 5

Printing of a copy of a high resolution map formed from a 5 mil rastor that varied continuously in optical density was carried out in a manner identical to that used for Examples 1-3 with a horizontal scan rate of 350 cycles/in (137.8 cycles/cm) and the following record currents:

| Original Optical Density | Record Current, mA |
|---|---|
| 0.05 | 7.7 |
| 0.12 | 8.9 |
| 0.20 | 10.5 |
| 0.35 | 12.2 |
| 0.50 | 16.6 |
| 0.65 | 19.4 |
| 0.80 | 21.1 |
| 0.90 | 26.0 |
| 1.10 | 30.0 |
| 1.25 | 31.5 |
| 1.40 | 32.9 |
| 2.10 | 36.9 |

The composition of the toner was the same as that used in Examples 1-3, but the average size of the magnetic toner particles was 2-3 μm. The lithoplate substrate was 12 mil (0.30 mm) thick anodized aluminum with a surface roughness of 10.9μ in (0.28 μm). The printed images appeared grainy. The use of smoother lithoplate substrates will essentially eliminate this grainy appearance.

EXAMPLE 6, SHOWING A

A continuous tone image was scanned with a photocell and the output of the photocell used to set the amplitude modulation of the square wave record signal. The record current used to correspond to black regions of the original (optical density 1.7) was 70 mA. The record current used to correspond to white regions of the original was 20 mA. The record current was varied linearly with optical density from white to black.

A 1.5 mil (38.1 μm) wide Betamax ®98-6001-91 record head was used to scan a 170 μin (4.3 μm) thick $CrO_2$ magnetic record medium coated on 5-mil (0.13 mm) aluminized Mylar ® polyester film. The line-to-line spacing was 2 mils (50.8 μm) for Example 6 and 1 mil (25.4 μm) for Showing A. The horizontal spatial frequency was 350 cycle/in (137.8 cycles/cm).

Each of the latent magnetic images was toned with magnetic toner bath comprised of a 10 g of magnetic toner dispersed in 500 cc of $H_2O$ containing 2.5 g Spartan SD-20 all purpose cleaner. The magnetic toner was comprised of 50 weight percent $Fe_3O_4$ and 50 weight percent Atlac ® 382 polyester resin with average toner particle size of 7 μm. The toned images were rinsed with a solution comprised of 2.5 g Spartan SD-50 all purpose cleaner in 500 cc of $H_2O$ and dried.

The toned image of Showing A contained streaks as a result of line-to-line magnetic interactions. The toned image of Example 6 showed no streaking. Wider line-to-line spacings prevented magnetic line-to-line interactions.

EXAMPLES 7-8, SHOWING B

A reflectance step wedge was scanned with a photocell and the output of the photocell used to set the amplitude modulation of the square wave record signal. The record currents corresponding to the reflectance optical densities of the original were:

| Original Reflectance Optical Density | Record Current, mA |
|---|---|
| 0.05 | 0.75 |
| 0.12 | 2.4 |

-continued

| Original Reflectance Optical Density | Record Current, mA |
| --- | --- |
| 0.20 | 11.1 |
| 0.35 | 28.3 |
| 0.50 | 36.7 |
| 0.65 | 41.6 |
| 0.80 | 45.2 |
| 0.95 | 47.4 |
| 1.10 | 48.0 |
| 1.25 | 48.4 |

The record current was applied to a 1.5 mils (38.1 μm) wide Betamax® 98-6001-91 record head which scanned a 450 μin (11.4 μm) thick $CrO_2$ magnetic record medium that was coated onto 7-mil (0.18 mm) polyester film. The line-to-line spacing was 1.636 (41.55 μm) for Showing B, 2.0 mils (50.8 μm) for Example 7 and 2.20 mils (55.9 μm) for Example 8. The horizontal spatial frequency of the square wave was 350 cycles/in (137.8 cycles/cm).

The latent magnetic images were toned with a magnetic toner bath comprised of 10 g of magnetic toner dispersed in 500 cc of $H_2O$ containing 2.5 g Fluorad® FC-128 dispersing agent. The magnetic toner was comprised of 50 weight percent $Fe_3O_4$ and 50 weight percent Atlac® 382 with average toner particle size of 2-3 μm. The toned image was rinsed with solution comprised of 2.5 g Fluorad® FC-128 in 500 cc of $H_2O$ and then air dried.

The toned magnetic image of Showing B showed very pronounced streaking as a result of line-to-line magnetic interactions. This streaking was only very slightly evident in the toned magnetic image of Example 7 and nearly completely eliminated in the toned magnetic image of Example 8. This shows that the line-to-line spacing, i.e., the distance between the centers of the scan lines should be at least about 1.2 times the record head width in order to reduce line-to-line magnetic interactions to an acceptable level.

The magnetic toner was removed from the latent magnetic image on the $CrO_2$ medium of Example 8 and an attempt was made to tone the latent magnetic image with a dry magnetic toner with particles similar to those used above in the wet toner, i.e. comprised of 50 weight % $Fe_3O_4$ and 50 weight % Atlac® 382, with average toner particle size of 2-3 μm to which was added 0.5 weight % Tullanox® 500 silica purchased from Tulco, Inc. to improve the flowability of the toner. It was not possible to develop the image with this dry toner.

The latent magnetic image of Example 8 was then developed with the dry magnetic toner comprised of 50% wt Atlac® 580E, 50% wt $Fe_3O_4$ treated with 0.5% Quso®, a colloidal silica, with average toner particle size of 8 microns. Atlac® 580E has a molecular weight of 1450 and is a polyester of bisphenol-A and fumaric acid having terminal vinyl groups modified by inclusion of a methane moiety. 0.5 mil Mylar® adhesive tape was placed against the toned $CrO_2$ magnetic medium and the toned image removed and transferred to Kromekote® paper. Three shades of gray were visible on the transferred toner image.

The latent image of Example 8 was then toned with 10 g of magnetic toner dispersed in 500 cc of $H_2O$ containing 2.5 g Fluorad® FC-128. The magnetic toner was comprised of 50% wt $Fe_3O_4$ treated with 0.5% wt Quso®, a colloidal silica, with average toner particle size of 8 microns.

The toned image was rinsed with a solution comprised of 2.5 g Fluorad® FC-128 in 500 cc of $H_2O$ and then air dried. The toner image was transferred to Kromekote® paper with 0.5 mil Mylar® adhesive tape as described above. Eight shades of gray were visible on the transferred toner image as compared to the three shades high contrast development obtained with dry toner. This demonstrates the importance of using a wet toner to tone the latent magnetic image of this invention.

EXAMPLE 9

Copies of a continuous tone image were printed in a manner very similar to that used in Examples 4 and 5 except that anodized aluminum lithoplate substrates were prepared to determine the effect of lithoplate surface roughness on the quality of the printed copies.

The lithoplate substrates were made by the following procedure: 12 mil (0.31 mm) aluminum sheets (2¾"×24"—7.05 cm×61.0 cm) were washed in 5% trisodium phosphate solution at 80° C., rinsed in distilled $H_2O$, and anodized at 14 V and 7 A for 30 minutes in a 15 weight percent $H_2SO_4$ solution at 25° C. The anodized samples were rinsed in distilled $H_2O$ and then immersed in distilled $H_2O$ containing 2 weight percent sodium silicate at 90° C. for 2 min. Finally the anodized samples were rinsed in distilled $H_2O$.

The printing was carried out by scanning the original with the photocell and the output of the photocell used to set the amplitude modulation of the square wave record signal. The record currents corresponding to the reflectance optical densities of the original were:

| Original Optical Density | Recording Current mA |
| --- | --- |
| 0.05 | 1.6 |
| 0.12 | 3.6 |
| 0.20 | 6.6 |
| 0.35 | 10.6 |
| 0.50 | 13.5 |
| 0.65 | 15.4 |
| 0.80 | 19.6 |
| 0.95 | 23.8 |
| 1.10 | 26.9 |
| 1.25 | 30.5 |
| 1.40 | 36.3 |
| 2.10 | 48.7 |

A 1.5 mil (38.1 μm) wide Betamax® 98-6001-91 record head scanned a 160 μin (4.1 μm) thick $CrO_2$ magnetic record medium coated on a 5-mil (0.13 mm) aluminized Mylar®. The line-to-line spacing was 2 mils (50.8 μm) and the horizontal spatial frequencies was 350 cycles/in (137.8 cycles/cm).

The latent magnetic image was toned with a magnetic toner bath comprised of 10 g of magnetic toner dispersed in 500 cc of $H_2O$ containing 2.5 g of Fluorad® FC-128 dispersing agent. The magnetic toner was comprised of 50 weight percent $Fe_3O_4$ and 50 weight percent Atlac® 382 with average toner particle size of 2-3 μm. The toned image was rinsed with solution comprised of 2.5 g Fluorad® FC-128 in 500 cc of $H_2O$ and then air dried.

The toned image is mounted on the 5" (12.7 cm) diameter print roll of the toner image transfer apparatus disclosed in Nacci and Pye, cited above. An anodized aluminum sheet, prepared as described in this example, with a surface roughness of 3.9 μin (0.099 μm) served as the lithoplate substrate and was preheated to 108° C. and pushed into the nip of the transfer apparatus. Nip pressure was 40 lb per linear inch (70 N per linear cm). The toned image was transferred to the aluminum at a rate of 6 in/sec. (15.2 cm/sec). There was complete transfer of the toner to the aluminum substrate to form a lithoplate.

The lithoplate was mounted on a Miehle offset lithography press and was printed out. Kromekote ® paper using black ink. The printed images were less grainy than the printed images of Example 5 where the lithoplate substrates had a roughness of 10.9 μin (0.28 μm).

EXAMPLE 10

Copies of a space map described in Example 5 were printed using the conditions given in Example 9. The only difference was in the preparation of the anodized lithoplate substrates. 25 mil (0.635 mm) Alzak ® anodized aluminum sheets (2¾"×24"—7.05 cm×61.0 cm) were immersed in 2000 cc of distilled $H_2O$ containing 70 cc of 85% $H_3PO_4$ solution and 40 g chromic acid until the anodized coating was dissolved (about 5 min). The sheets were rinsed in distilled $H_2O$ and dried. The sheets were anodized at 14 V and 5 A for 30 minutes in a 15 weight percent $H_2SO_4$ solution at 25° C. The anodized samples were rinsed in distilled $H_2O$ and then immersed in distilled $H_2O$ containing 2 weight percent sodium silicate at 90° C. for 2 min. The anodized sheets were rinsed in distilled $H_2O$ and dried using air at 90° C.

The image quality was excellent and not grainy. The region of the printed image corresponding to 2.10 optical density had a reflectance optical density of 1.55. The anodized lithoplate substrate had a surface roughness of 1.47 μin (0.037 μm).

EXAMPLE 11

To demonostrate color printing color separation images (cyan, yellow, and magenta) of space maps described in Example 5 printed on black and white photographic paper were in turn scanned with the photocell and the output of the photocell used to set the amplitude modulation of the square wave record signal. The record currents corresponding to the reflectance optical densities of the original were:

| Original Optical Density | Record Current, mA |
|---|---|
| 0.05 | 2.9 |
| 0.12 | 6.2 |
| 0.20 | 9.4 |
| 0.35 | 13.9 |
| 0.50 | 17.1 |
| 0.65 | 19.2 |
| 0.80 | 23.2 |
| 1.10 | 27.0 |
| 1.25 | 35.0 |
| 1.40 | 40.5 |
| 2.10 | 50.1 |

The record equipment and conditions of Example 8 were used and each of the latent magnetic images were toned and the toner transferred to anodized aluminum substrates to form three lithoplates following the method of Example 9 except that the anodized aluminum substrates were those of Example 10 and the anodized aluminum plate with the transferred toner were heated to 150° C. to insure good adhesion of the toner image to the anodized aluminum.

A Miehle offset lithographic press was used to print the magnetic ink on Kromekote ® paper. The yellow image was printed in register on the magenta image with a yellow ink. The cyan lithoplate could not be registered with the two printed images due to poor alignment of the image on the plate. Therefore, it was used to print, with a cyan printing ink, on 500 D Mylar ®. The cyan image on Mylar ® was manually placed over the yellow and magenta image on Kromekote ® paper forming an excellent full color image of the space map.

I claim:

1. A printing process comprising forming a latent magnetic image in a magnetic recording medium which is at least 100 μm thick by applying electric wave recording signal to a magnetic recording head with the amplitude of said signal a function of the optical density of the desired image, said magnetic recording head having a width between about 0.5 mil and 5 mils; causing said magnetic recording head to repeatedly traverse the magnetic record medium in a series of aligned parallel paths to form the latent magnetic image in the magnetic recording medium with the distance between the centers of the parallel paths being from about 1.2 to 2 times the width of the recording head and with a horizontal spatial frequency of from about 200 to 1000 cycles/in; decorating the latent magnetic image with oleophilic magnetic toner particles comprising magnetic particles, encapsulated in a coalescible polymer binder, having an average size of from about 2 to about 7 μm, dispersed in a liquid vehicle, thereby forming a decorated image; rinsing said toned image with a liquid; drying said decorated image; bringing said toned image into momentary contact under pressure with a heated rigid, smooth lithoplate substrate having a roughness of less than about 10 μ inches, whereby said toner particles are transferred to said heated substrate to form an image of at least partially coalesced toner particles on said substrate; further coalescing said image if necessary thereby forming a lithographic printing plate which accepts ink in the toned areas containing the ink receptive polymer but does not accept ink in the areas free of toner; applying ink to said lithoplate; and transferring the ink to a final support.

2. The process of claim 1 in which the distance between the centers of the parallel paths of the magnetic record head is between about 1.4 to about 1.6 times the width of the recording head, the average size of the toner particles is between 2 and 3 μm, and the substrate surface roughness is less than about 5 μinches.

3. The process of claim 2 in which the lithoplate substrate is anodized aluminum, brush grained aluminum, aluminum matte, chrome plate or stainless steel.

4. A process for printing copies of an image-containing document which comprises illuminating said image-containing document; scanning said image with a photocell which receives light emanating from said image-containing document, said scanning being accomplished in a series of parallel sweeps in the form of narrow paths across said image; applying an electric wave recording signal to a magnetic recording head with the amplitude of said signal determined by the output of the photocell and corresponding to the optical density of the portion of the image being scanned, said magnetic record head having a width of from about 0.5 mil to about 5 mils; causing said magnetic record head to traverse a magnetic recording medium which is at least 100 μm thick in a series of aligned parallel paths analogous to those scanned by the photocell to form a latent magnetic image on the recording medium which image is a replica of the image being scanned with the intensity of the magnetic recording of any individual area related to the integrated intensity received by the photocell from a corresponding area of the original image with the distance between the centers of the parallel paths being from about 1.2 to about 2.0 times the width of the record head and with a horizontal spatial frequency of from about 200 to 1000 cycles/in; decorating the thus formed latent magnetic image with an oleophilic magnetic toner comprising magnetic particles, encapsulated in a coalescible polymer binder having an average particle size of from 2 to 7 $\mu$m, which toner is dispersed in a liquid vehicle, thereby forming a toned image, rinsing said image with a liquid; drying the decorated image; bringing said toned image into momentary contact under pressure with a heated rigid, smooth lithoplate substrate, having a roughness of less than about 10 $\mu$inches, whereby said toner particles are transferred to said heated substrate to form an image of at least partially coalesced toner particles on said substrate, if necessary further coalescing said image thereby forming a lithographic printing plate which accepts ink in the toned areas containing the ink receptive polymer but will not accept ink in the areas free of toner; applying ink to said lithoplate; and transferring the ink to another final support.

5. The process of claim 4 in which the distance between the centers of the parallel paths of the magnetic record head is between about 1.4 to 1.6 times the record head width, the average size of the toner particles is between 2 and 3 $\mu$m, and the substrate surface roughness is less than about 5 $\mu$inches.

6. The process of claim 5 in which the lithoplate substrate is anodized aluminum, brush grained aluminum, aluminum matte, chrome plate or stainless steel.

7. The process of claim 6 in which the magnetic record medium is $CrO_2$, the recording signal is a square wave, the toner particles are formed of $Fe_3O_4$ and a polyester and the lithoplate substrate is anodized aluminum.

8. The process of claim 7 in which the record head width is 1.5 mils (38.1 $\mu$m) and the distance between the center of the magnetic record head paths is 2 mils (50.8 $\mu$m).

* * * * *